United States Patent [19]

Ueta et al.

[11] Patent Number: 5,399,623
[45] Date of Patent: Mar. 21, 1995

[54] VULCANIZABLE FLUORORUBBER COMPOSITION

[75] Inventors: Yutaka Ueta; Settsu Minamino, both of Osaka, Japan

[73] Assignee: Daikin Industries, Ltd., Osaka, Japan

[21] Appl. No.: 211,321

[22] PCT Filed: Jul. 27, 1993

[86] PCT No.: PCT/JP93/01049
§ 371 Date: Apr. 6, 1994
§ 102(e) Date: Apr. 6, 1994

[87] PCT Pub. No.: WO94/03541
PCT Pub. Date: Feb. 17, 1994

[30] Foreign Application Priority Data

Aug. 6, 1992 [JP] Japan ................................. 4-210135

[51] Int. Cl.6 .................................................. C08F 8/00
[52] U.S. Cl. .................................. 525/276; 525/326.3; 525/384
[58] Field of Search ....................... 525/326.3, 276, 384

[56] References Cited

U.S. PATENT DOCUMENTS

| | | |
|---|---|---|
| 3,853,828 | 12/1974 | Wall et al. ................. 525/326.3 |
| 4,035,565 | 7/1977 | Apotheker et al. . |
| 4,214,060 | 7/1980 | Apotheker et al. . |
| 4,243,770 | 1/1981 | Tatemoto et al. . |
| 4,501,869 | 2/1985 | Tatemoto et al. . |
| 4,900,793 | 2/1990 | Lagow et al. ................. 525/326.3 |
| 5,219,904 | 6/1993 | Abe ............................. 525/326.3 |

Primary Examiner—Bernard Lipman
Attorney, Agent, or Firm—Birch, Stewart, Kolasch & Birch

[57] ABSTRACT

A vulcanizable fluororubber composition which contains (a) an iodine- and/or bromine-containing fluororubber,
(b) a vulcanizing agent which is an organic peroxide, and
(c) a compound of the formula:

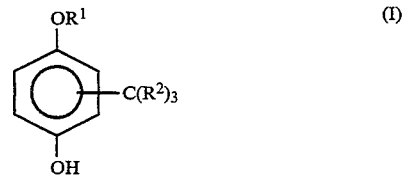

wherein $R^1$ and $R^2$ each is an alkyl group having 1 to 3 carbon atoms, in an amount of 0.05 to 5 ppm based on the fluororubber (a) gives a transparent colorless vulcanized material.

8 Claims, No Drawings

VULCANIZABLE FLUORORUBBER COMPOSITION

BACKGROUND OF THE INVENTION

1. Field of the Invention

The present invention relates to a vulcanizable fluororubber composition which gives a colorless cured material.

2. Related Art

In the field of the preparation of a semiconductor, a vulcanized fluororubber is used as a sealing material for an instrument for generating plasma. The conventional sealing material has the problems that the particles are generated and that the leakage is caused by the deterioration of the sealing material. Preferably, the sealing material contains no filler and is transparent so that the dust is visible. However, when the filler is merely excluded, the vulcanized fluororubber becomes transparent brown or opaque brown so that it cannot be transparent colorless.

SUMMARY OF THE INVENTION

An object of the present invention is to provide a fluororubber composition which gives a transparent colorless vulcanized material.

The present invention provide a vulcanizable fluororubber composition comprising:

(a) an iodine- and/or bromine-containing fluororubber, (b) a vulcanizing agent which is an organic peroxide, and (c) a compound of the formula:

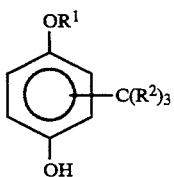

wherein $R^1$ and $R^2$ each is an alkyl group having 1 to 3 carbon atoms, in an amount of 0.05 to 5 ppm based on the fluororubber (a).

DETAILED DESCRIPTION OF THE INVENTION

The iodine- and/or bromine-.containing fluororubber (a) is a polymer in which an iodine and/or bromine atom in an amount of 0.001 to 10% by weight, preferably 0.01 to 5% by weight is bonded to a carbon atom of a fluorine-containing polymer. Although the carbon atom to which the iodine and/or bromine atom is bonded is preferably an end of a polymer chain, the present invention is not limited to this so that the carbon atom bonding to the iodine and/or bromine atom may be the carbon atom in the main chain, the branch chain or the branch point.

The iodine- and/or bromine-containing fluororubber (a) means a fluorinated polymer having rubber-like elasticity at a room temperature after the vulcanization. A fluororubber includes any of conventionally known fluororubbers. Typical examples of the fluororubber are fluororubbers such as a vinylidene fluoride/hexafluoropropylene; polymer (a preferable molar ratio of vinylidene fluoride to hexafluoropropylene is from 45:55 to 95:5), a vinylidene fluoride/tetrafluoroethylene/hexafluoropropylene polymer (a preferable molar ratio of vinylidene fluoride/tetrafluoroethylene/hexafluoropropylene is 25–90:1–35:1–50), a vinylidene fluoride/chlorotrifluoroethylene polymer, a tetrafluoroethylene/propylene polymer, a hexafluoropropylene/ethylene polymer, a perfluoroalkyl vinyl ether (which includes a plural of ether linkages)/olefin (for example, tetrafluoroethylene, ethylene and the like) polymer (a preferable molar ratio of the perfluoroalkyl vinyl ether to the olefin is from 15:85 to 75:25), a fluorosilicone polymer, a fluorophosphazene polymer and the like. The examples of the iodine- and/or bromine-containing fluororubber (a) are described in, for example, U.S. Pat. Nos. 4,243,770, 4,035,565 and 4,214,060 (the disclosures of which are incorporated herein by reference), Japanese Patent Kokai Publication No. 125491/1978, Japanese Patent Kokoku Publication No. 4115/1978 and Japanese Patent Kokai Publication No. 20310/1984. The iodine- and/or bromine-containing fluororubber (a) can be prepared by, for example, adding an iodine- and/or bromine-containing compound (for example, $ICH_2CF_2CF_2OCF=CF_2$ and the like) to the above monomers (for example, vinylidene fluoride and the like) and conducting the polymerization. The iodine- and/or bromine-containing fluororubber (a) usually has a molecular weight of 1,000 to 1,000,000.

The vulcanizing agent (b) is not limited, insofar as it is the organic peroxide. Specific examples of the vulcanizing agent (b) are 1,1-bis(t-butylperoxy)-3,5,5-trimethylcyclohexane, 2,5-dimethylhexane-2,5-dihydroxyperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, 2,5-dimethyl-2,5-di(-benzoylperoxy)hexane, t-butylperoxymaleic acid, t-butylperoxyisopropyl carbonate and the like. The amount of the vulcanizing agent (b) is from 0.1 to 5.0 parts by weight per 100 parts by weight of the fluororubber (a).

The component (c) is the compound of the formula (I) which acts as a stabilizing agent. Specific examples of the compound (I) are 2-t-butyl-4-methoxyphenol (m-t-butyl-p-hydroxyanisole), 3-t-butyl-4-methoxyphenol, 2-t-butyl-4-ethoxyphenol, 3-t-butyl-4-ethoxyphenol, 2-t-butyl-4-propoxyphenol, 3-t-butyl-4-propoxyphenol, 2-( 1,1-diethylpropyl)-4-methoxyphenol, 3-( 1,1 -diethylpropyl)-4 methoxyphenol, 2-( 1,1 -dipropylbutyl)-4-methoxyphenol, 3-( 1,1-dipropylbutyl)-4-methoxyphenol, 2-( 1,1 -diethylpropyl)-4ethoxyphenol, 3-( 1,1 -diethylpropyl)-4-ethoxyphenol, 2-( 1,1 -dipropylbutyl)-4-ethoxyphenol, 3-( 1,1 -dipropylbutyl)-4-ethoxyphenol, 2-( 1,1-diethylpropyl)-4-propoxyphenol, 3-( 1,1 -diethylpropyl)-4-propoxyphenol and the like. The amount of the component (c) is from 0.05 to 5 ppm, preferably from 0.5 to 2.5 ppm based on the fluororubber (a).

The composition of the present invention may contain a crosslinking aid (d). The crosslinking aid (d)is basically effective, when it has the reaction activity to a peroxy radical and a polymer radical. The type of the crosslinking aid (d) is not specifically limited. The crosslinking aid (d) is usually a polyfunctional compound which contributes to the vulcanization by the radical functionality (for example, a compound which contains at least two $CH_2=CH-$, $CH_2=CH-CH_2-$ and/or $CF_2=CF-$ groups). Preferable examples of the crosslinking aid (d) are triallyl cyanurate, triallyl isocyanurate, triacryl formal, triallyl trimellitate, N,N'-m-phenylene bismaleimide, dipropargyl terephthalate, diallyl phthalate, tetraallyl terephathalamide, triallyl phosphate, hexafluorotriallyl isocyanurate and N-methyltetrafluorodiallyl isocyanurate. The amount of the crosslinking aid (d) is usually at most 10 parts by weight, preferably from 0.1 to 5.0 parts by weight per 100 parts by weight of the fluororubber (a).

The composition may contain a small amount of an additive, if the additive does not deteriorate the transparency. The composition may contain a small amount of a colorant so as to color the composition (so that the composition is transparent colored one).

The procedure for mixing homogeneously these components includes a method comprising mixing the stabilizing agent (c) with the vulcanizing agent (b) and the optional crosslinking aid (d) and then using an open roll mill and a method comprising using a closed mixer such as a kneader.

The vulcanization can be conducted under the usual vulcanization conditions for the fluororubber. For example, the vulcanizable composition is mixed and charged in a mold, and the press vulcanization is conducted by keeping the composition at 100°–200° C. and 20–100 kg/cm² for 5–180 minutes and then the oven vulcanization is conducted by keeping this composition at 150°–300° C. in an oven for 0–50 hours so as to give a vulcanized rubber.

The fluororubber composition of the present invention can be used in the field in which the dust is extremely undesirable, particularly as a sealing material in a plasma generation instrument for preparing a semiconductor. It can be used also in a food field and a medical field.

PREFERRED EMBODIMENT OF THE INVENTION

The present invention will be illustrated by the following Examples and Comparative Examples which do not limit the present invention.

Example 1

Perhexa 2.5 B (manufactured by Nippon Oil & Fats Co. Ltd., an organic peroxide) (0.5 parts by weight) and triallyl isocyanurate (TAIC) (0.5 parts by weight) containing m-t-butyl-p-hydroxyanisole (BHA) (250 ppm) (1.25 ppm based on the fluororubber) were mixed with Dai-el perflo GA-15 [manufactured by Daikin Industries Ltd., an iodine-containing fluororubber (tetrafluoroethylene/perfluorovinylether copolymer)] (100 parts by weight) by an open roll mill to prepare a composition.

The press vulcanization was conducted at 160° C. for 10 minutes and the oven vulcanization was conducted at 180° C. for 4 hours to prepare a vulcanized rubber sheet (thickness: 2 mm). Various properties were measured according to JIS (Japanese Industrial Standard) K6301. In addition, the color of the fluororubber sheet after the vulcanization was observed. The results are shown in Table 1.

Examples 2 and 3 and Comparative Example 1

The same procedure as in Example 1 was repeated, except that components shown in Table 1 were used. Dai-el G-912 (manufactured by Daikin Industries Ltd.) is an iodine-containing fluororubber (a vinylidene fluoride/tetrafluoroethylene/hexafluoropropylene copolymer), Dai-el G-902 (manufactured by Daikin Industries Ltd.) is an iodine-containing fluororubber (a vinylidene fluoride/tetrafluoroethylene/hexafluoropropylene copolymer), and BHT is 2,6-di-t-butyl-4-methylphenol.

TABLE 1

|  | Ex. 1 | Ex. 2 | Ex. 3 | Com. Ex. 1 |
|---|---|---|---|---|
| GA-15 | 100 |  |  | 100 |
| G-912 |  | 100 |  |  |
| G-902 |  |  | 100 |  |
| Perhexa 2.5B | 0.5 | 0.5 | 0.5 | 0.5 |
| TAIC (containing 250 ppm of BHA) | 0.5 | 0.25 | 0.5 |  |
| TAIC (containing 50 ppm of BHT) |  |  |  | 0.5 |
| Properties |  |  |  |  |
| $M_{100}$ | 19 | 9 | 11 | 18 |
| $T_B$ | 88 | 33 | 36 | 92 |
| $E_B$ | 260 | 550 | 620 | 250 |
| $H_s$ | 59 | 56 | 60 | 60 |
| Color | Transparent colorless | Transparent colorless | Transparent colorless | Transparent brown |

Comparative Example 2–6

The same procedure as in Example 1 was repeated to prepare the vulcanized rubber sheet, except that the type and amount of compounds shown in Table 2 were used instead of 250 ppm of m-t-butyl-p-hydroxyanisole. The color of the vulcanized rubber sheet was observed and a total light transmittance was measured. The total light transmittance was measured by DIRECT READING HAZE METER manufactured by TOYO SEIKI SEISAKUSHO, Ltd. The results are shown in Table 2, including the results of Example 1 and Comparative Example 1. TBH is 2-t-butylhydroquinone.

TABLE 2

|  | Stabilizing agent in TAIC (Type, Amount) | Amount of stabilizing agent (ppm) (based on fluororubber) | Color | Total light transmittance (%) |
|---|---|---|---|---|
| Ex.1 | BHA 250 ppm | 1.25 | Transparent colorless | 85 |
| Com. Ex. 1 | BHT 50 ppm | 0.25 | Transparent dark brown | 69 |
| Com. Ex. 2 | BHT 300 ppm | 1.5 | Transparent dark brown | 74 |
| Com. Ex. 3 | BHT 500 ppm | 2.5 | Transparent dark brown | 76 |
| Com. Ex. 4 | TBH 300 ppm | 0.25 | Transparent brown | 72 |
| Com. Ex. 5 | TBH 500 ppm | 2.5 | Transparent brown | 75 |
| Com. Ex. 6 | None | 0 | Transparent light brown | 80 |

Example 4 and Comparative Examples 7 and 8

The same procedure as in Example 1 was repeated to prepare the vulcanized rubber sheet, except that the amount of m-t-butyl-p-hydroxyanisole was as shown in Table 3. With respect to the vulcanized rubber sheet, the color was observed and the total light transmittance was measured. The results are shown in Table 3, including the results of Example 1 and Comparative Example 6.

TABLE 3

| | Amount of stabilizing agent (ppm) (content in TAIC) | Amount of stabilizing agent (ppm) (based fluororubber) | Color | Total light transmittance (%) |
|---|---|---|---|---|
| Com. Ex. 6 | 0 | 0 | Transparent brown | 80 |
| Ex. 4 | 10 | 0.05 | Transparent colorless | 83 |
| Ex. 1 | 250 | 1.25 | Transparent colorless | 85 |
| Com. Ex. 7 | 3000 | 15 | Transparent brown | 82 |
| Com. Ex. 8 | 10000 | 50 | Transparent brown | 81 |

What is claimed is:

1. A vulcanizable fluororubber composition comprising:
   (a) an iodine- and/or bromine-containing fluororubber,
   (b) a vulcanizing agent which is an organic peroxide, and
   (c) a compound of the formula:

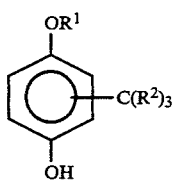

$$\text{(I)}$$

wherein $R^1$ and $R^2$ each is an alkyl group having 1 to 3 carbon atoms, in an amount of 0.05 to 5 ppm based on the fluororubber (a).

2. The composition according to claim 1, wherein the amount of the vulcanizing agent (b) is from 0.1 to 5.0 parts by weight per 100 parts by weight of the fluororubber (a).

3. The composition according to claim 1, wherein the fluororubber (a) is a polymer in which an iodine and/or bromine atom in an amount of 0.001 to 10% by weight is bonded to a carbon atom of a fluorine-containing polymer.

4. The composition according to claim 1, wherein the vulcanizing agent (b) is selected from the group consisting of 1,1-bis(t-butylperoxy)-3,5,5-trimethylcyclohexane, 2,5-dimethylhexane-2,5 dihydroxyperoxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne -3, benzoyl peroxide, t-butylperoxybenzene, 2,5-dimethyl-2,5-di(benzoylperoxy)hexane, t-butylperoxymaleic acid and t-butylperoxyisopropyl carbonate.

5. The composition according to claim 1, wherein the compound of the formula (I) is selected from the group consisting of 2-t-butyl-4-methoxyphenol, 3-t-butyl-4-methoxyphenol, 2-t-butyl-4-ethoxyphenol, 3-t-butyl-4-ethoxyphenol, 2-t-butyl-4-propoxyphenol, 3-t-butyl-4-propoxyphenol, 2-(1,1-diethylpropyl)-4-methoxyphenol, 3-(1,1-diethylpropyl)-4-methoxyphenol, 2-(1,1-dipropylbutyl)-4 methoxyphenol, 3-(1,1-dipropylbutyl)-4-methoxyphenol, 2-(1,1-diethylpropyl)-4-ethoxyphenol, 3-(1,1-diethylpropyl)-4-ethoxyphenol, 2-(1,1-dipropylbutyl)-4-ethoxyphenol, 3-(1,1-dipropylbutyl)-4 ethoxyphenol, 2-(1,1-diethylpropyl)-4-propoxyphenol and 3-(1,1-diethylpropyl)-4-propoxyphenol.

6. The composition according to claim 1, wherein the composition further contains a crosslinking aid (d) and the crosslinking aid (d) has at least two groups which are selected from the group consisting of $CH_2=CH-$ group, $CH_2=CH-CH_2-$ group and $CF_2=CF-$ group.

7. The composition according to claim 6, wherein the amount of the crosslinking aid (d) is from 0.1 to 5.0 parts by weight per 100 parts by weight of the fluororubber (a).

8. A cured material prepared by vulcanizing the composition according to claim 1.

* * * * *

UNITED STATES PATENT AND TRADEMARK OFFICE
CERTIFICATE OF CORRECTION

PATENT NO. : 5,399,623
DATED : March 21, 1995
INVENTOR(S) : Ueta, et al.

It is certified that error appears in the above-indentified patent and that said Letters Patent is hereby corrected as shown below:

On the Title page, item [75] inventors: please change second-listed inventor from "Settsu" to --Etsuo--.

Signed and Sealed this

Twentieth Day of February, 1996

Attest:

BRUCE LEHMAN

*Attesting Officer*      *Commissioner of Patents and Trademarks*